United States Patent
Chung et al.

(10) Patent No.: US 11,553,400 B2
(45) Date of Patent: Jan. 10, 2023

(54) FAST CELL ALLOCATION SCHEDULING DEVICE AND METHOD FOR MOBILE NODE IN 6TISCH NETWORK

(71) Applicant: Pusan National University Industry-University Cooperation Foundation, Busan (KR)

(72) Inventors: Sanghwa Chung, Busan (KR); Minjae Kim, Busan (KR)

(73) Assignee: Pusan National University Industry-University Cooperation Foundation, Busan (KR)

( * ) Notice: Subject to any disclaimer, the term of this patent is extended or adjusted under 35 U.S.C. 154(b) by 10 days.

(21) Appl. No.: 17/411,752

(22) Filed: Aug. 25, 2021

(65) Prior Publication Data
US 2022/0210719 A1  Jun. 30, 2022

(30) Foreign Application Priority Data
Dec. 28, 2020 (KR) .................. 10-2020-0185342

(51) Int. Cl.
*H04W 40/36* (2009.01)
*H04W 40/24* (2009.01)
*H04W 80/02* (2009.01)
*H04W 8/28* (2009.01)
*H04W 40/12* (2009.01)

(52) U.S. Cl.
CPC ............. *H04W 40/36* (2013.01); *H04W 8/28* (2013.01); *H04W 40/12* (2013.01); *H04W 40/248* (2013.01); *H04W 80/02* (2013.01)

(58) Field of Classification Search
None
See application file for complete search history.

(56) References Cited

U.S. PATENT DOCUMENTS

| 2016/0174192 | A1* | 6/2016 | Raghu | H04W 72/1289 370/329 |
|---|---|---|---|---|
| 2018/0254971 | A1* | 9/2018 | Thubert | H04L 45/02 |
| 2018/0288782 | A1* | 10/2018 | Kim | H04W 72/1257 |
| 2020/0296001 | A1* | 9/2020 | She | H04L 41/0668 |

FOREIGN PATENT DOCUMENTS

| KR | 10-2017-0036760 A | 4/2017 |
|---|---|---|
| KR | 10-2017-0102707 A | 9/2017 |
| KR | 10-2020-0071638 A | 6/2020 |

* cited by examiner

*Primary Examiner* — Brian S Roberts
(74) *Attorney, Agent, or Firm* — Paratus Law Group, PLLC

(57) ABSTRACT

Disclosed are fast cell allocation scheduling device and method for a mobile node in a 6TiSCH network, in which when link quality of the mobile node is changed, a fixed path directed to a route node is allocated to establish a movement-route node fixed path minimizing a delay time between the mobile node and the route node.

12 Claims, 12 Drawing Sheets

FIG. 5

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| RPLInstanceID |Version Number |             Rank              |
+-+-+-+-+-+-+-+-+-+-+-+-+-+-+-+-+-+-+-+-+-+-+-+-+-+-+-+-+-+-+-+-+
|G|0| MOP | Prf |     DTSN      |     Flags     |   Reserved    |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                            DODAGID                            +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|   Option(s)...
+-+-+-+-+-+-+-+-+
```

FAST CELL ALLOCATION SCHEDULING DEVICE AND METHOD FOR MOBILE NODE IN 6TISCH NETWORK

ACKNOWLEDGEMENT

This research was supported by the MSIT (Ministry of Science and ICT), Republic of Korea, under a Grand Information Technology Research Center support program (IITP-2021-2016-0-00318) supervised by the IITP (Institute for Information & communications Technology Planning & Evaluation).

CROSS-REFERENCE TO RELATED APPLICATION

This application claims priority to Korean Patent Application No. 10-2020-0185342 filed on Dec. 28, 2020, which is hereby incorporated by reference in its entirety.

BACKGROUND

The present disclosure relates to an industrial IoT network, and more particularly, to a fast cell allocation scheduling device and method for a mobile node in a 6TISCH network in which a communication node satisfies stability of an industrial application and real-time requirements through high reliability and low power operation by combining a time slot access, multiple channels, and a channel hopping technology of time slotted channel hopping (TSCH).

As one of the media access control (MAC) operating modes of the IEEE 802.15.4 standard protocol, IEEE 802.15.4e TSCH provides high reliability and stability as standard protocols for industrial wireless sensor networks such as the existing wireless HART or ISA100.11a.

Conflicts or contention that may occur during wireless communication are solved through media access control technology that divides time into time slots. In addition, a multi-path fading problem may be solved by preventing collisions by changing a frequency as time slots increase through a channel hopping technology. With the time division access characteristics and the channel hopping characteristics of hopping several channels, high reliability is supported even in a plant environment with a lot of metal structures, and a decisive delay time may be guaranteed by providing communication according to a schedule for an access of devices regarding divided time slots.

In the TSCH network, each node is synchronized with respect to time. A region including a time slot and a channel is called a cell, and each node exchanges packets through the cell. A set of time slots and transmittable channels is called a slot frame, and the slot frame repeats continuously during network formation. An absolute slot number is a total number of time slots that have passed since the network was formed and is shared by all nodes.

A frequency actually used by each node in the network is selected based on an expression corresponding to Equation 1.

$$f=F[ASN+ChannelOffset) \bmod ChannelNumber] \quad \text{[Equation 1]}$$

FIG. 1 shows a state in which six nodes form a TSCH network and exchange data. Packets are exchanged by repeating Tx, Rx, and sleep in one cell divided into a slot offset and a channel offset. In a shared cell, a control message is exchanged to help form or maintain a network.

An enhanced beacon (EB) for configuring a network or a DODAG information object (DIO) for forming a network topology are representative examples. In a fixed cell, packets of a designated node may be sent and received. A scheduling technique for determining when (in which time slot) and by which channel each node exchanges packets is not covered by the IEEE 802.15.4e TSCH standard and vary according to a specific application.

FIG. 2 is a block diagram illustrating exchange of packets of a designated node in a fixed cell.

As shown in FIG. 2, a length of one cell on the TSCH standard is 10 ms, which is a time sufficient for transmitting a frame and receiving an ACK.

In an unused cell, no packet transmission is performed by any node, and each node maintains in a sleep state. IETF 6top is a 6TiSCH operation sublayer, which is a next higher layer of the IEEE 802.15.4e TSCH MAC layer.

A TSCH cell between two different nodes is added or removed through distributed scheduling of the 6TiSCH network. It consists of scheduling function (SF) defining rules to determine when to add or delete cells and 6top protocol (6P) managing schedules of two different cells.

6P allows two adjacent nodes to add/delete/relocate cells in the TSCH schedule. Two adjacent nodes negotiate locations of cells to be added, deleted, or relocated in the TSCH schedule. This negotiation process is called a 6P transaction and includes two or three steps.

The two or three-step 6P transaction will be described through the following example.

FIG. 3 is a configuration diagram showing a two-step 6P transaction situation.

Node A requests Node B to allocate a cell.

Node A sends a 6P ADD request to node B requesting a communication-available cell. When node A sends a list of cells for node B to select and the desired cell number with a 6P ADD command, node B selects the most suitable cell and sends a 6P response message to node A.

FIG. 4 is a configuration diagram illustrating a three-step 6P transaction situation.

Node A requests Node B to allocate a cell.

Node A requesting a communication-available cell sends a 6P ADD request to Node B.

Unlike the two-step 6P transaction situation, when node A sends a 6P ADD command, an empty cell list, and the number of cells that need to be negotiated, node B puts the most suitable cell into the cell list and sends a 6P response message to node A.

Node A stores the cell list suitable for itself as many as the number of cells in the cell list field and acknowledges it.

IETF RPL (IPv6 Routing Protocol) corresponds to a 3 layer protocol in a 6TiSCH network stack. RPL forms a destination oriented directed acyclic graph (DODAG) in a wireless sensor network environment and has a tree-type topology in which a route node, which serves as a gateway, is a single destination by collecting sensors from each node.

RPL uses RANK to prevent a cycle or loop phenomenon in a network.

RANK represents a relative distance between each node and the route node, and a method of calculating RANK varies according to an objective function (OF). OF used as a standard in RPL is OF0, and RANK is determined according to expected transmission count (ETX) and received signal strength indication (RSSI).

ETX, as an expected transmission count, is a measure of quality of a link between two nodes.

A method of calculating this is the same as in Equation 2.

$$Rank(N)=Rank(P)+Rank_{increase}$$

$$Rank_{increase}=Step \times MinHopRankIncrease \quad \text{[Equation 2]}$$

FIG. 5 is a packet configuration diagram in which a node having calculated RANK propagates its own information to neighbor nodes.

To form and maintain a topology, RPL utilizes periodically broadcast control messages. Nodes participating in a network to form the topology propagate DODAG information solicitation (DIS) messages to the RPL network. This is a request message for requesting a DODAG information object (DIO) message.

A node that receives the DIS message broadcasts DIO. A sensor node that receives the DIO message calculates OF, selects a node having the smallest RANK value as its preferred parent node, and forms DODAG.

The node that calculates RANK transmits information in the DIO message field of FIG. 5 and propagates its own information to neighbor nodes within a communication-available distance.

After selecting a preferred parent node, the node forming the DODAG transmits a destination advertisement object (DAO) message from a fixed cell of the TSCH network to a route node, and the route node stores address information in a routing table based on the DAO message. A downlink path may be formed by referring to the DAO message received from the route node and the formed routing table.

However, the cell allocation scheduling method for a mobile node of the related art has the following problems.

In a situation in which a worker checks a sensor operation status and continuously communicates with a sensor, while moving, results of a facility inspection may be sent to the center.

A link connection between a mobile node attached to the worker and each sensor node in the network should be assigned quickly, and a packet of a result value should be transmitted to a central node with low latency.

Although there are a number of techniques for creating and maintaining a schedule in each slot of the TSCH, research into a scheduling technique for supporting mobility has not been actively conducted.

Due to the nature of the mobile node, a communication link with a parent node is frequently reallocated. When the communication link with the existing parent node is temporarily disconnected due to movement of the mobile node, it is necessary to minimize drop of packets generated by the parent mobile node.

Accordingly, there is a demand for the development of a new technology for cell allocation scheduling of mobile nodes that may ensure stability of industrial applications and meet and real-time requirements.

RELATED ART DOCUMENT

Patent document (Patent document 1) Korean Patent Laid-Open Publication No. 10-2017-0036760
(Patent document 2) Korean Patent Laid-Open Publication No. 10-2020-0071638
(Patent document 3) Korean Patent Laid-Open Publication No. 10-2017-0102707

SUMMARY

The present disclosure is to solve the problems of the cell scheduling technology in the industrial IoT network of the related art, and provides a fast cell allocation scheduling device and method for a mobile node in a 6TiSCH network in which a communication node satisfies stability of an industrial application and real-time requirements through high reliability and low power operation by combining a time slot access, multiple channels, and a channel hopping technology of time slotted channel hopping (TSCH).

The present disclosure also provides a fast cell allocation scheduling device and method for a mobile node in a 6TiSCH network in which, in response to a change in link quality of a mobile node immediately, a packet thereof is delivered to a neighbor node to reset a path and drop of a transmitted packet is minimized.

The present disclosure also provides a fast cell allocation scheduling device and method for a mobile node in a 6TiSCH network in which, in a 6TiSCH network including a mobile node, a communication link is rapidly recovered in a situation in a communication link of the mobile node to its preferred parent node is frequently released due to movement of the mobile node, thereby minimizing drop of a packet generated in the mobile node.

The present disclosure also provides a fast cell allocation scheduling device and method for a mobile node in a 6TiSCH network in which a fixed path for a mobile node to generate a packet to be directed to a route node is allocated to minimize a delay time between the mobile node and the route node.

Other objects of the present disclosure are not limited to the above-mentioned objects, and other objects not mentioned will be clearly understood by those skilled in the art from the following description.

According to embodiments of the present disclosure, a fast cell allocation scheduling device for a mobile node in a 6TiSCH network includes: a link release detection unit configured to allow a mobile node to detect release of a link to a preferred parent node due to movement of the mobile node; a DIS message transmission unit configured to allow the mobile node to broadcast a DIS message from a shared cell; a unicast control message reception unit configured to receive a unicast control message when a shared cell of a neighbor node detects a DIS message transmitted from the mobile node and transmits the unicast control message to the mobile node from a unicast-only Tx cell; a DIO message reception unit configured to receive a DIO message including a MAC address of neighbor node propagated from the neighbor node when a unicast DIO message to be directed toward the mobile node is sent from the shared cell; a preferred parent node setting unit configured to allow the mobile node to minimize a collision of the DIO message in the shared cell and to configure a routing path; and a packet transceiver unit configured to start data transmission when a routing path is configured with the preferred parent node, wherein, when link quality of the mobile node is changed, a fixed path directed to a route node is allocated to establish a movement-route node fixed path minimizing a delay time between the mobile node and the route node.

To establish the movement-route node fixed path, a new node may participate in a network, and when a DAO message is transmitted to the route node, the route node may collect a MAC address of the node participating in the network and add a movement flag in the DAO message to distinguish between a stop node and a mobile node.

The DAO message may be received from the route node, and when the DAO message is not a mobile node, a slot offset and a channel offset may be stored in an automatic cell using a hash value of a MAC address of a node transmitting DAO so as to become a basis for allocating a Tx cell of the mobile node when the movement-route node fixed path is formed.

The route node may allocate a movement-route node fixed path starting cell in a position in which an influence on a schedule is minimized based on cell information of the route node.

A shared cell and an automatic cell may be stored in the route node, the shared cell may be a dedicated cell for exchanging an EB, DAO, or DIO control message and the automatic cell is a value stored to allocate a Tx cell of the mobile node in the movement-route node fixed path in the route node, and communication may not be performed in a corresponding cell.

When a cell negotiation process has undergone to the route node, the route node may put a negotiation completion message and movement-route fixed path routing table in a DIO frame and propagate the message and the table so that DIO is shared in every node participating in a network, and all the nodes of the network may store a MAC address of the mobile node and the movement-route fixed path.

According to embodiments of the present disclosure, a fast cell allocation scheduling method for a mobile node in a 6TiSCH network includes: detecting release of a link to a preferred parent node by a mobile node; broadcasting, by the mobile node, a DIS message in a shared cell; when a DIS message transmitted from the mobile node is detected in a shared cell of a neighbor node, immediately transmitting a unicast control message from a unicast-only Tx cell to the mobile node, turning on a radio in a control-only Rx cell of the neighbor node and receiving a unicast control message by the mobile node; when a unicast DIO message directed toward the mobile node is transmitted in the shared cell, receiving, by the mobile node, a DIO message including a MAC address of itself propagating by the neighbor node while the mobile node maintains a topology; configuring, by the mobile node, a routing path with the preferred parent node, while minimizing a collision of the DIO message in the shared cell; and starting data transmission when the routing path to the preferred parent node is configured.

To establish the movement-route node fixed path, a new node may participate in a network, and when a DAO message is transmitted to the route node, the route node may collect a MAC address of the node participating in the network and add a movement flag in the DAO message to distinguish between a stop node and a mobile node.

The DAO message may be received from the route node, and when the DAO message is not a mobile node, a slot offset and a channel offset may be stored in an automatic cell using a hash value of a MAC address of a node transmitting DAO so as to become a basis for allocating a Tx cell of the mobile node when the movement-route node fixed path is formed.

After the movement-route node fixed path is established, a MAC address of the mobile node may be delivered together, while propagating to neighbor nodes in the movement-route node fixed path, and a slot offset and a channel offset may be determined using a hash value of the sum of a MAC address of a neighbor node which has received the movement-route node fixed path and a MAC address of the mobile node to allocate a unicast control-only Tx cell.

The allocated cell may be maintained usually in a sleep state, and when connection of the mobile node to its preferred parent node is established and the mobile node broadcasts a flag indicating the necessity of configuring a new topology included in a DIS message, a corresponding cell may transmit a unicast DIO message directed toward the mobile node.

While the mobile node maintains the topology, a DIO message including its MAC address propagated by the neighbor node may be received, and when the mobile node receives the DIO message, the mobile node may determine a slot offset and a channel offset using the MAC addresses of the neighbor node and the mobile node and allocate a unicast control-only Rx cell, so that since the MAC addresses of the neighbor node and the mobile node are known and the unicast control-only cell is allocated based on the MAC address hash value, a collision with the neighbor node does not occur.

As described above, the fast cell allocation scheduling device and method for a mobile node in a 6TiSCH network according to the present disclosure have the following effects.

First, a communication node may satisfy stability of an industrial application and real-time requirements through high reliability and low power operation by combining a time slot access, multiple channels, and a channel hopping technology of time slotted channel hopping (TSCH).

Second, in response to a change in link quality of a mobile node immediately, a packet thereof may be delivered to a neighbor node to reset a path and drop of a transmitted packet may be minimized.

Third, a communication link may be rapidly recovered in a situation in a communication link of the mobile node to its preferred parent node is frequently released due to movement of the mobile node, thereby minimizing drop of a packet generated in the mobile node.

Fourth, a fixed path for a mobile node to generate a packet to be directed to a route node may be allocated to minimize a delay time between the mobile node and the route node.

BRIEF DESCRIPTION OF THE DRAWINGS

FIG. 5 is a packet configuration diagram in which a node having calculated RANK propagates its own information to neighbor nodes.

FIG. 11 is a block diagram illustrating a process of turning on a radio in a control-only Rx cell of a neighbor node and receiving a unicast control message.

FIG. 12 is a block diagram illustrating a process of turning off the radio of a control-only Rx cell of a slot offset so that unicast control messages from other neighbor nodes are not received any longer.

DETAILED DESCRIPTION

Hereinafter, a preferred embodiment of a fast cell allocation scheduling device and method for a mobile node in a 6TiSCH network according to the present disclosure will be described in detail as follows.

Features and advantages of the fast cell allocation scheduling device and method for a mobile node in a 6TiSCH network according to the present disclosure will become apparent through detailed description of each embodiment below.

Figure 1:
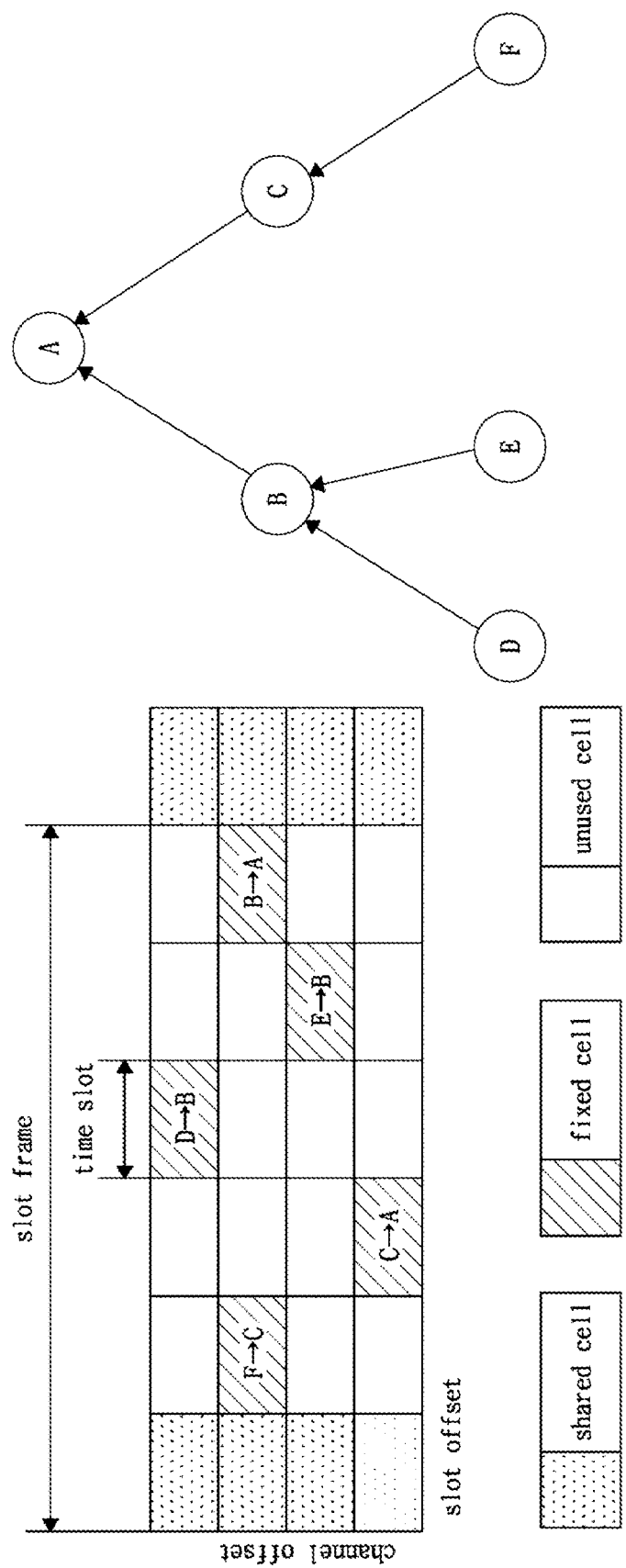
FIG. 1 is a configuration diagram illustrating a process in which six nodes form a TSCH network to exchange data.
Figure 2:
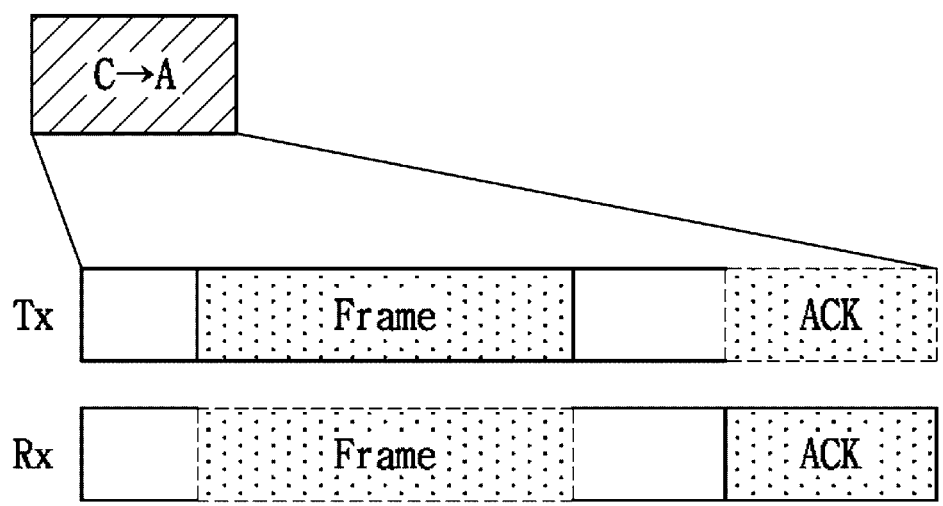
FIG. 2 is a configuration diagram showing exchange of packets of a designated node in a fixed cell.
Figure 3:
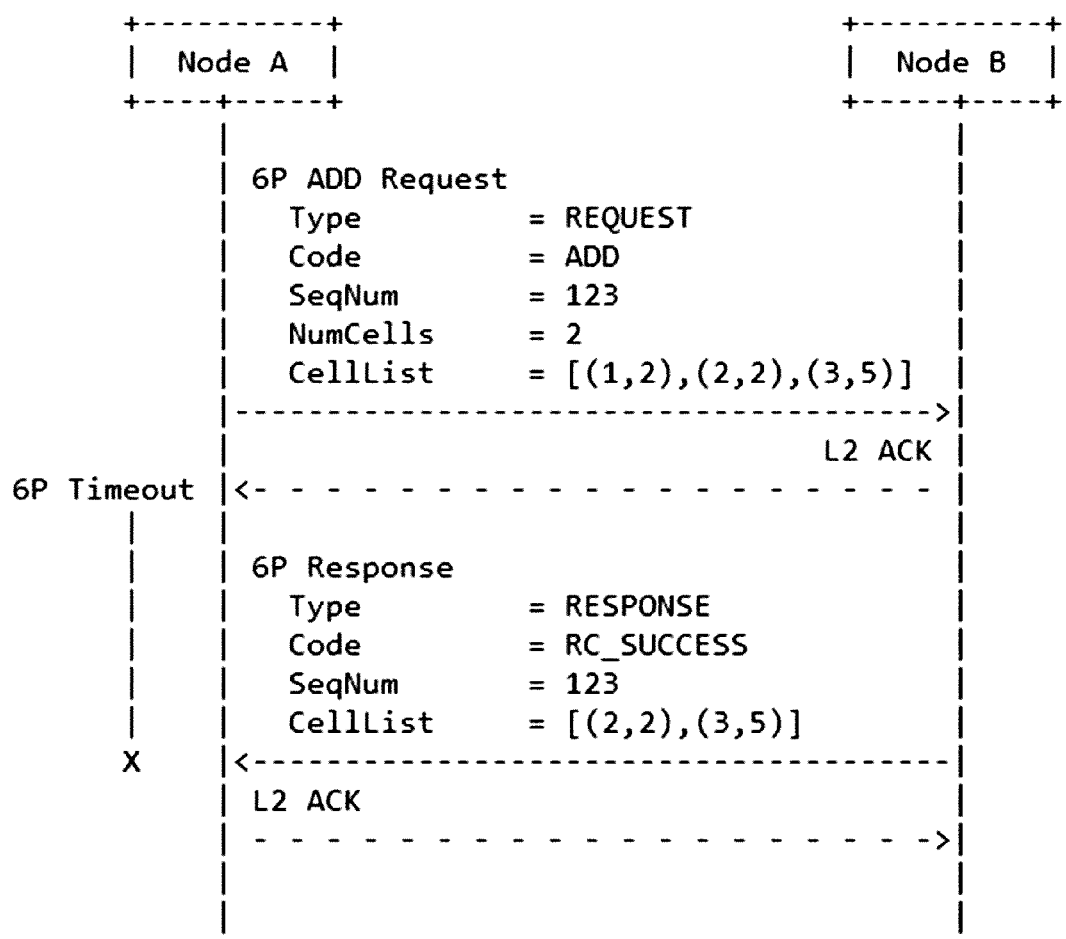
FIG. 3 is a configuration diagram showing a two-step 6P transaction situation.
Figure 4:
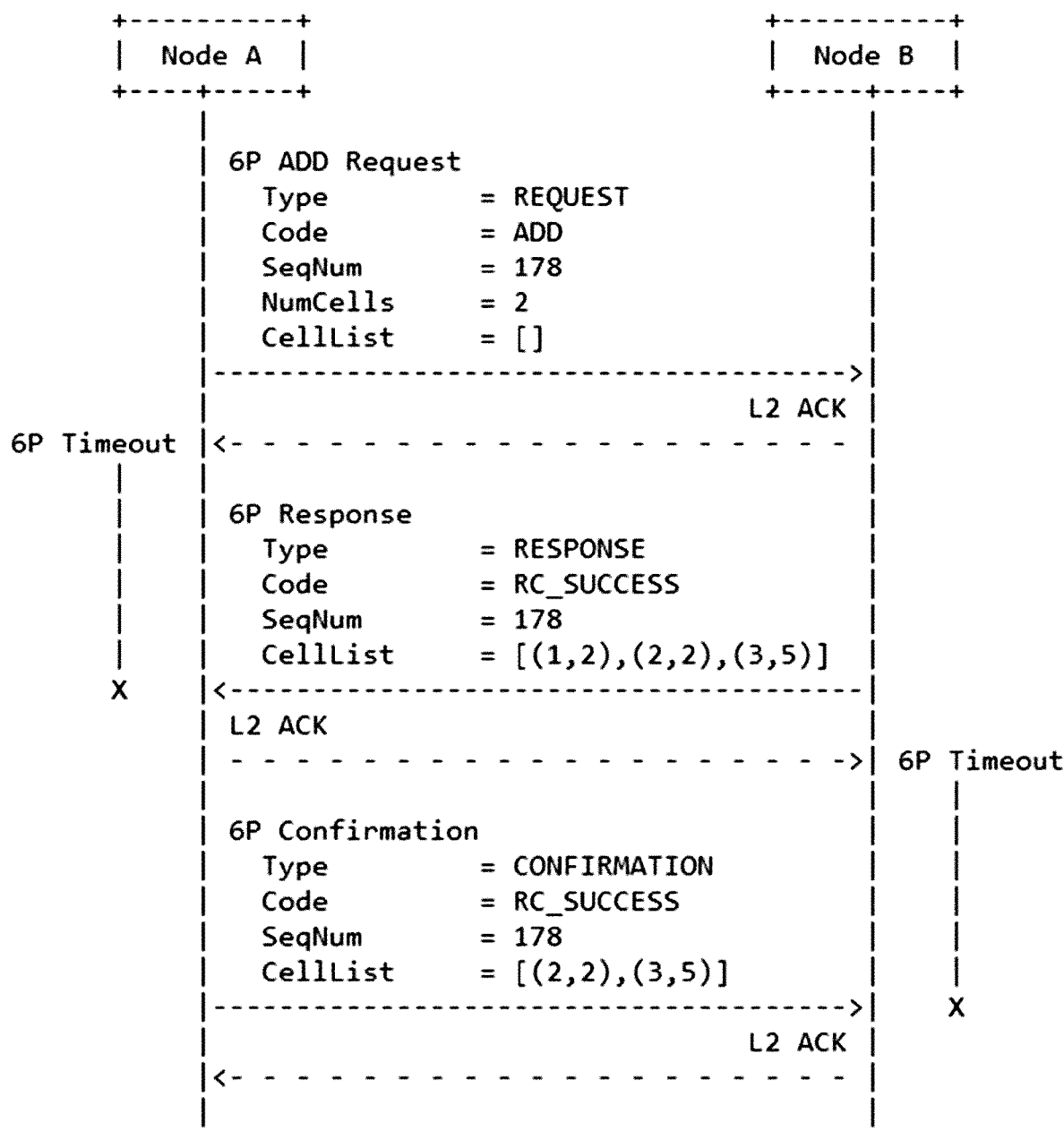
FIG. 4 is a configuration diagram showing the three-step 6P transaction situation.
Figure 6:
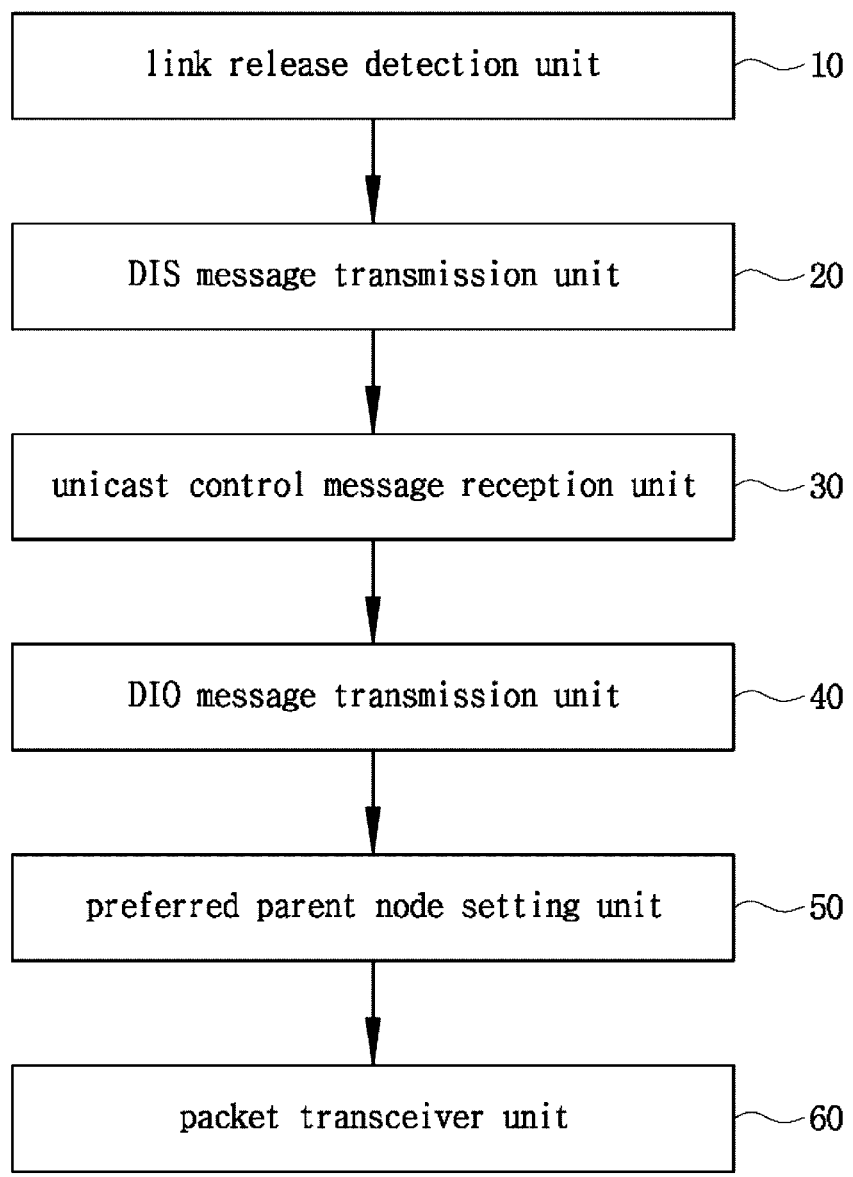
FIG. 6 is a block diagram of a fast cell allocation scheduling device for a mobile node in a 6TiSCH network according to the present disclosure.

FIG. 6 is a block diagram of a fast cell allocation scheduling device for a mobile node in a 6TiSCH network according to the present disclosure.

In a fast cell allocation scheduling device and method for a mobile node in a 6TiSCH network, a communication node satisfies stability of an industrial application and real-time requirements through high reliability and low power operation by combining a time slot access, multiple channels, and a channel hopping technology of time slotted channel hopping (TSCH).

To this end, the present disclosure may include a configuration in which, in response to a change in link quality of a mobile node immediately, a packet thereof is delivered to a neighbor node to reset a path and drop of a transmitted packet is minimized.

The present disclosure may include a configuration in which, in a 6TiSCH network including a mobile node, a communication link is rapidly recovered in a situation in a communication link of the mobile node to its preferred parent node is frequently released due to movement of the mobile node, thereby minimizing drop of a packet generated in the mobile node.

The present disclosure may include a configuration in which a fixed path for a mobile node to generate a packet to be directed to a route node is allocated to minimize a delay time between the mobile node and the route node.

Each node of the 6TiSCH network allocates or removes a cell through the 6top protocol after the synchronization process. When a preferred parent node is changed due to movement of the mobile node, the cell with the previous parent node should be released and a cell negotiation process with a preferred parent node should be performed again. In this process, packet drop occurs and delay time occurs in the process of reallocating cells.

Therefore, in order to minimize packet drop even if its preferred parent node is changed due to movement of the mobile node, a movement-route node fixed path which is a dedicated path for traffic starting from the mobile node and destined for the route node is constructed, and the fixed path is previously propagated to a neighbor node of the preferred parent node, so that when the preferred parent node of the mobile node is changed, a packet drop and a delay time may be minimized by quickly forming a fixed path.

As shown in FIG. 6, a fast cell allocation scheduling device for a mobile node in a 6TiSCH network includes a link release detection unit 10 configured to allow a mobile node to detect release of a link to a preferred parent node due to movement of the mobile node, a DIS message transmission unit 20 configured to allow the mobile node to broadcast a DIS message from a shared cell, a unicast control message reception unit 30 configured to immediately transmit a unicast control message to a mobile node when a shared cell of a neighbor node detects a DIS message transmitted from the mobile node and to turn on a radio in a control-only Rx cell of the neighbor node in the mobile node to receive a unicast control message, a DIO message reception unit 40 configured to receive a DIO message including a MAC address of neighbor node propagated from the neighbor node while the mobile node maintains a topology when a unicast DIO message to be destined for the mobile node is sent from the shared cell, a preferred parent node setting unit 50 configured to allow the mobile node to minimize a collision of the DIO message in the shared cell and to configure a routing path, and a packet transceiver unit 60 configured to start data transmission when a routing path is configured with the preferred parent node.

A fast cell allocation scheduling method for a mobile node in a 6TiSCH network according to the present disclosure will be described in detail as follows.

Figure 7A:
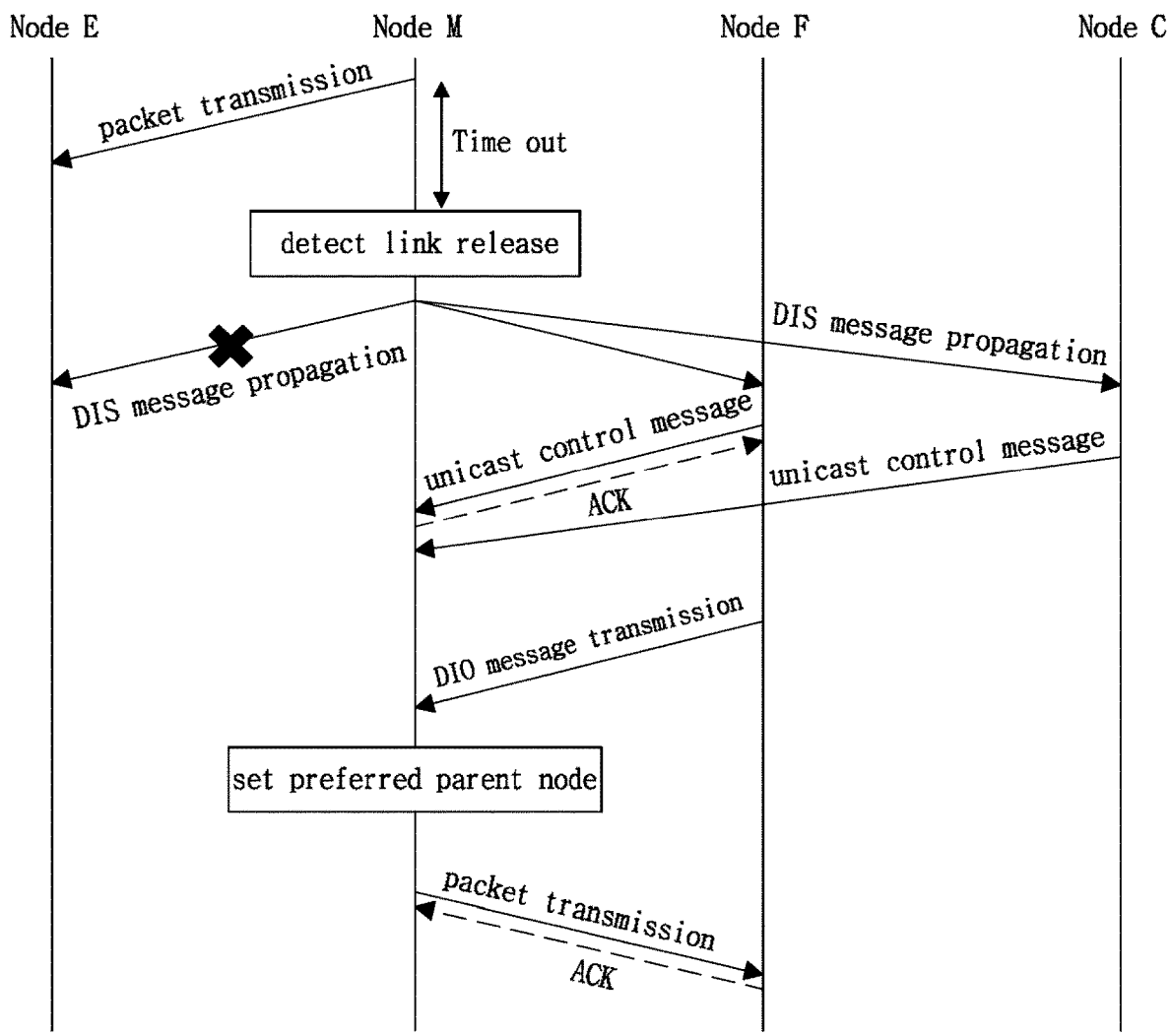
FIGS. 7A and 7B are flowcharts illustrating fast cell allocation scheduling method for a mobile node in a 6TiSCH network according to the present disclosure.
Figure 7B:
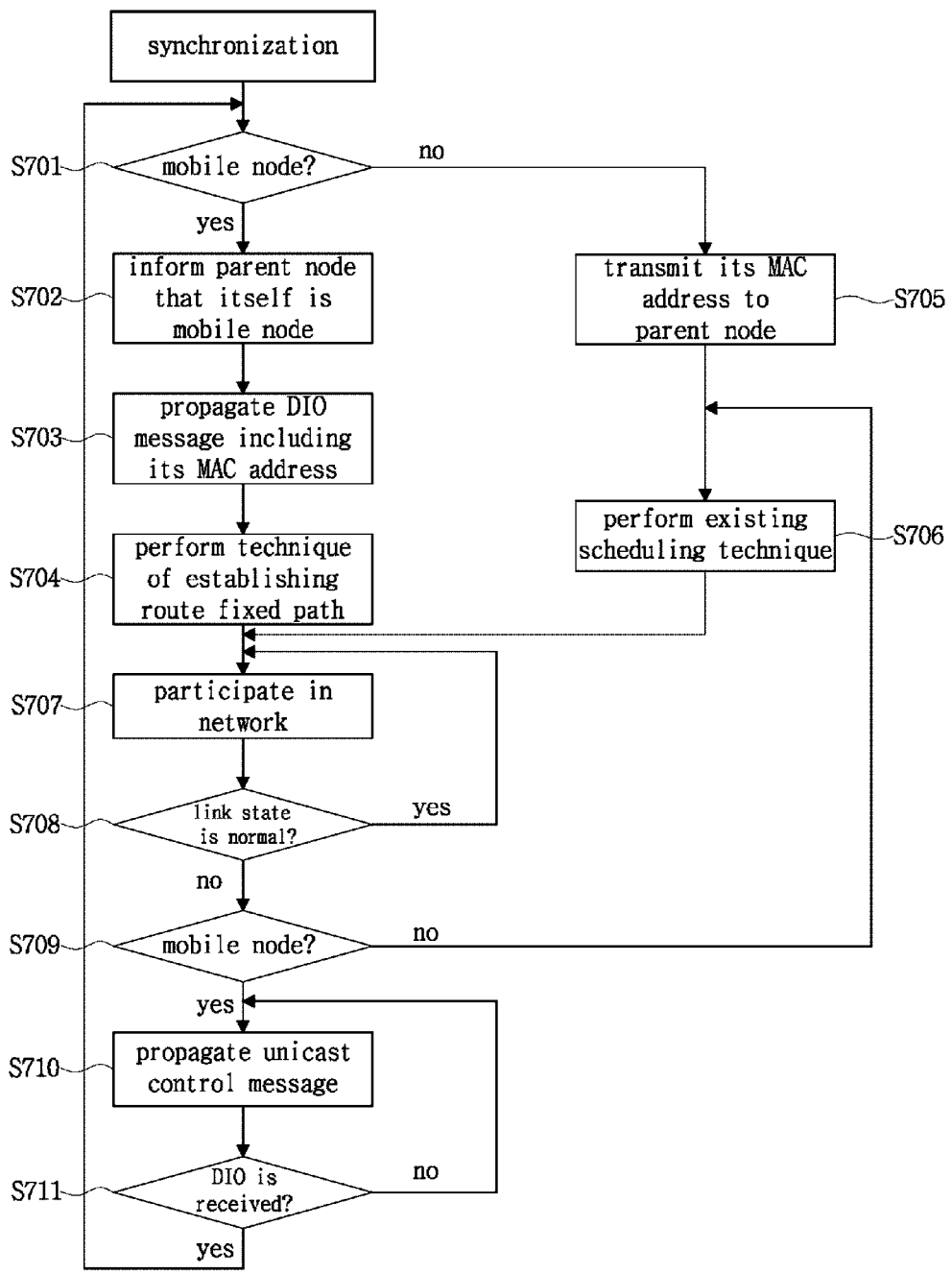

FIGS. 7A and 7B are operational flowcharts illustrating a fast cell allocation scheduling method for a mobile node in a 6TiSCH network according to the present disclosure.

As shown in FIG. 7A, the method for scheduling a fast cell assignment of a mobile node in a 6TiSCH network according to the present disclosure includes detecting release of a link to a preferred parent node by a mobile node, broadcasting, by the mobile node, a DIS message in a shared cell, when a DIS message transmitted from the mobile node is detected in a shared cell of a neighbor node, immediately transmitting a unicast control message from a unicast-only Tx cell to the mobile node, turning on a radio in a control-only Rx cell of the neighbor node and receiving a unicast control message by the mobile node, when a unicast DIO message directed toward the mobile node is transmitted in the shared cell, receiving, by the mobile node, a DIO message including a MAC address of itself propagating by the neighbor node while the mobile node maintains a topology, configuring, by the mobile node, a routing path with the preferred parent node, while minimizing a collision of the DIO message in the shared cell, and starting data transmission when the routing path to the preferred parent node is configured.

Specifically, as shown in FIG. 7B, after synchronization, the mobile node (S701) notifies the parent node that it is a mobile node (S702).

Next, the DIO message having its own MAC address is propagated (S703), and a fixed route is established (S704).

Then, by participating in the network (S707), it is determined whether the link state is normal (S708).

If the link state is not normal, the mobile node (S709) propagates a unicast message (S710) and determines whether the DIO message is received (S711).

If it is not the mobile node in step (S701), it transmits its MAC address to the parent mode (S705) and performs basic cell allocation scheduling (S706).

Figure 8:
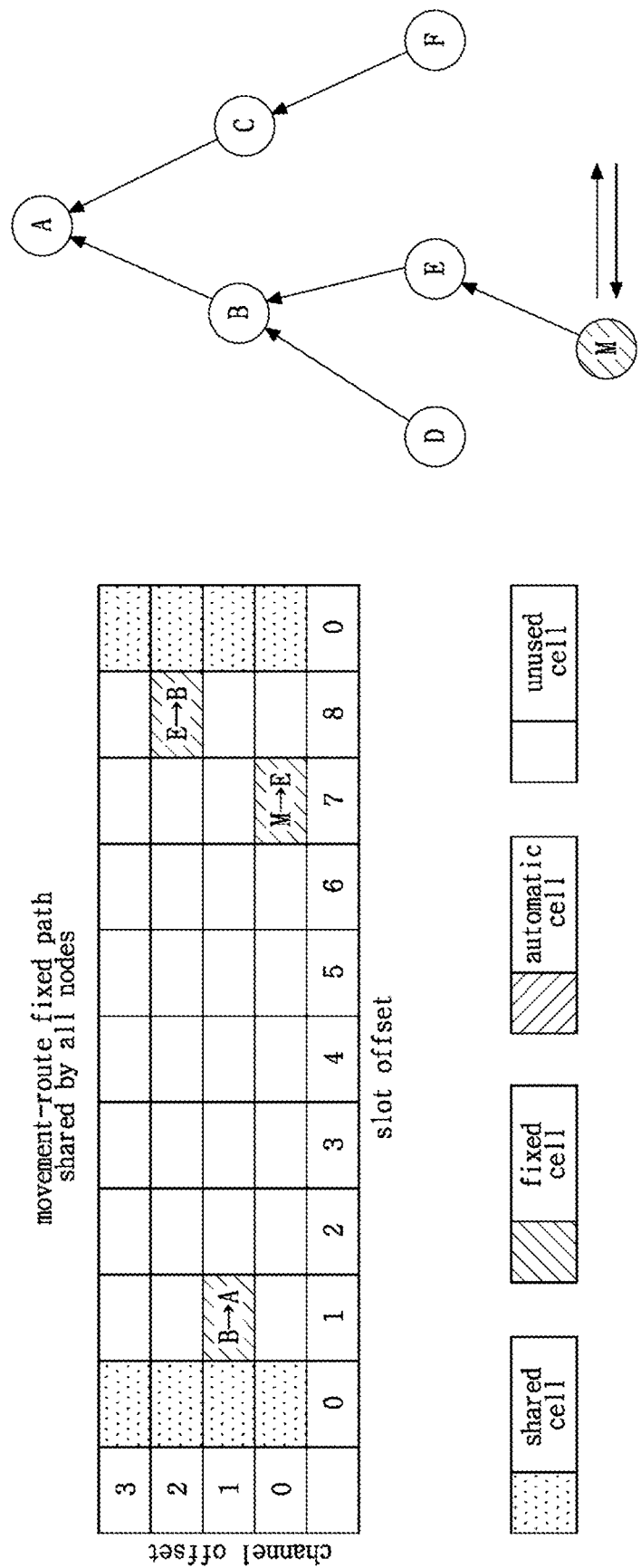
FIG. 8 is a configuration diagram showing a process in which a route node allocates a movement-route node fixed path based on cell information of the route node.

FIG. 8 is a configuration diagram showing a process in which a route node allocates a movement-route node fixed path based on cell information of the route node.

Movement-route node fixed path is formed through three processes.

First, when a new node participates in the network and sends a DAO message to the route node, the route node collects a MAC address of the node participating in the network. By adding a movement flag to the DAO message, it identifies a stationary node and a mobile node.

The DAO message is received by the route node and if the DAO message is not a mobile node, a slot offset and a channel offset are stored in an automatic cell using a hash value of the MAC address of the node that sent the DAO.

This is a basis for allocating a Tx cell of the mobile node when forming a movement-route node fixed path. The route node allocates a movement-route node fixed path start cell to a position in which an influence on an existing schedule is minimized based on cell information it has.

A shared cell and an automatic cell as shown in FIG. 8 are stored in the route node.

In FIG. 8, the shared cell is a dedicated cell capable of exchanging EB, DAO, and DIO control messages, and the alphabet of the automatic cell indicates a node participating in the network stored by the route node.

The automatic cell is a value stored for allocating the Tx cell of the mobile node in the movement-route node fixed path in the route node, and communication is not performed in the cell.

Figure 9:
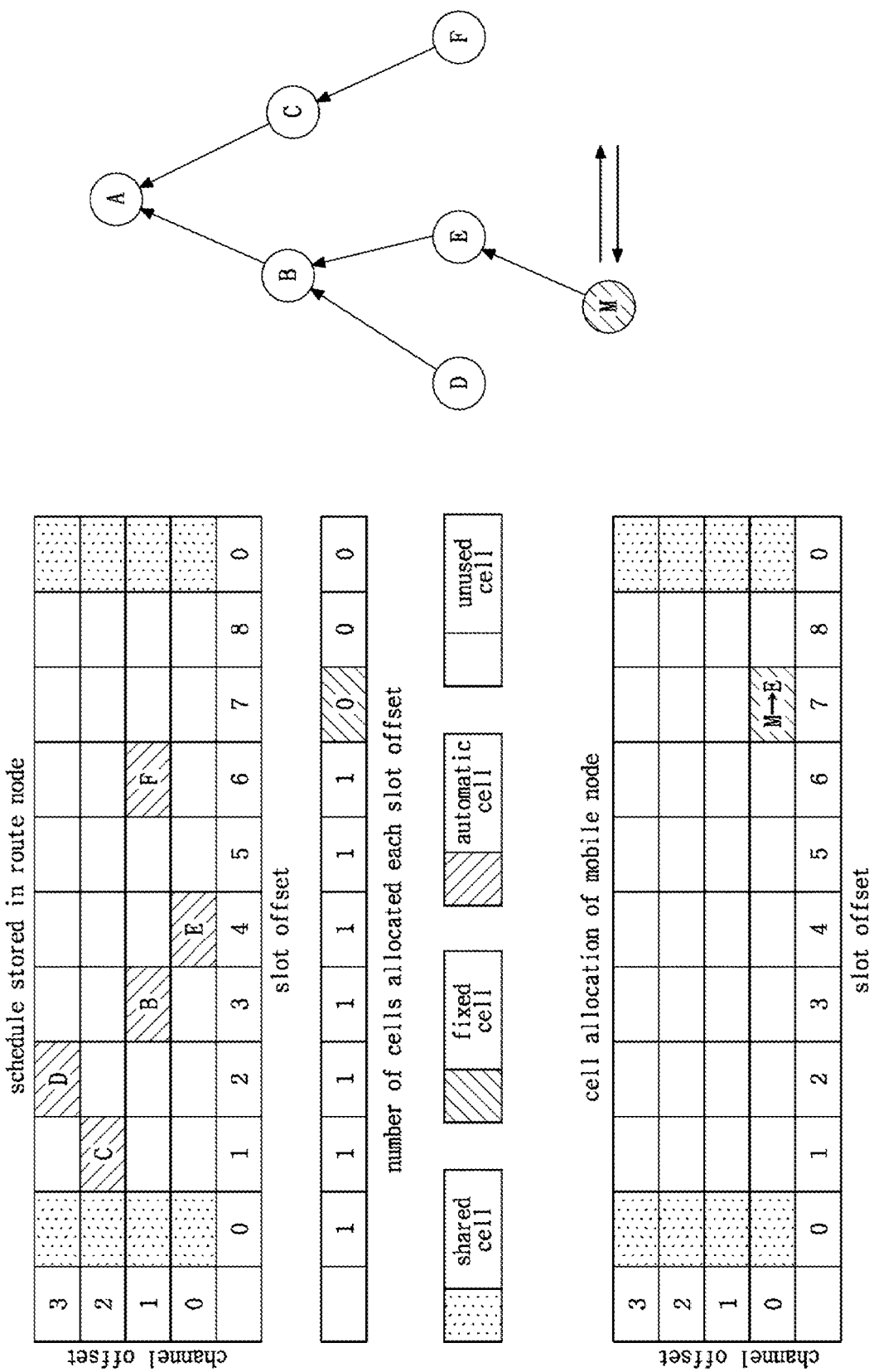
FIG. 9 is a configuration diagram illustrating a process of checking the number of cells allocated to each slot offset regardless of a channel offset.

FIG. 9 is a block diagram illustrating a process of checking the number of cells allocated to each slot offset regardless of a channel offset.

The route node receives the DAO message, and when the DAO message is determined to be a mobile node, the number of cells allocated to each slot offset is checked, regardless of the channel offset.

In FIG. 9, it can be seen that, irrespective of the channel offset, one cell is allocated to slot offset 1, one cell is allocated to slot offset 2, one cell is allocated to slot offset 3, . . . , 0 cell is allocated to slot offset 5, . . . , and 0 cell is allocated to slot offset 8.

If this is expressed as an array starting from slot offset 0 to the slot offset length, it may be expressed as [1, 1, 1, 1, 1, 0, 1, 0, 0]. Slot offset 0 is calculated as 1.

At this time, the Tx cell of the mobile node is allocated to a start slot of the slot offset with the largest number of consecutive zeros. This means that the movement-route node fixed path should build a packet transmission path with the shortest delay time from the mobile node to the route node, and a delay time may be short when each node is allocated to consecutive slot offsets while minimizing the influence of the schedule between the existing stationary nodes. When the Tx cell of the mobile node is allocated in the movement-route node fixed path, a cell of each node is allocated through a cell negotiation process of 6Top protocol sequentially from the mobile node to the route node.

A cell is allocated between a mobile node M and a node E through the cell negotiation process of the 6Top protocol. A cell negotiation process is performed between the node E and a node B, and in order to minimize the delay time, the cell negotiation is prioritized so that negotiation may be performed at 8, which is 1 greater than 7, which is the slot offset of the Rx cell of Node E. A cell negotiation process is performed between the node B and node A.

If the route node, node A, has gone through the cell negotiation process, the route node propagates a negotiation completion message and a movement-route fixed path routing table in a DIO frame.

The DIO is shared by all nodes participating in the network, and all nodes in the network store the movement-route fixed path and MAC address of the mobile node.

Although an algorithm for generating a packet in a mobile node, passing it through the preferred parent node, and delivering it to the route node has been presented, there are cases in which the packet cannot be transmitted because a link with the existing preferred parent node is released due to movement of the mobile node.

If a communication link with the preferred parent node is released and packet drop occurs, it may significantly affect applications that continue to collect data.

Therefore, when the mobile node recognizes that the link with its preferred parent node has been cut off, it notifies the neighbor node, sends a message that it wants to participate in the topology, and receives the DIO message without collision so that the link may be restored quickly.

Figure 10:
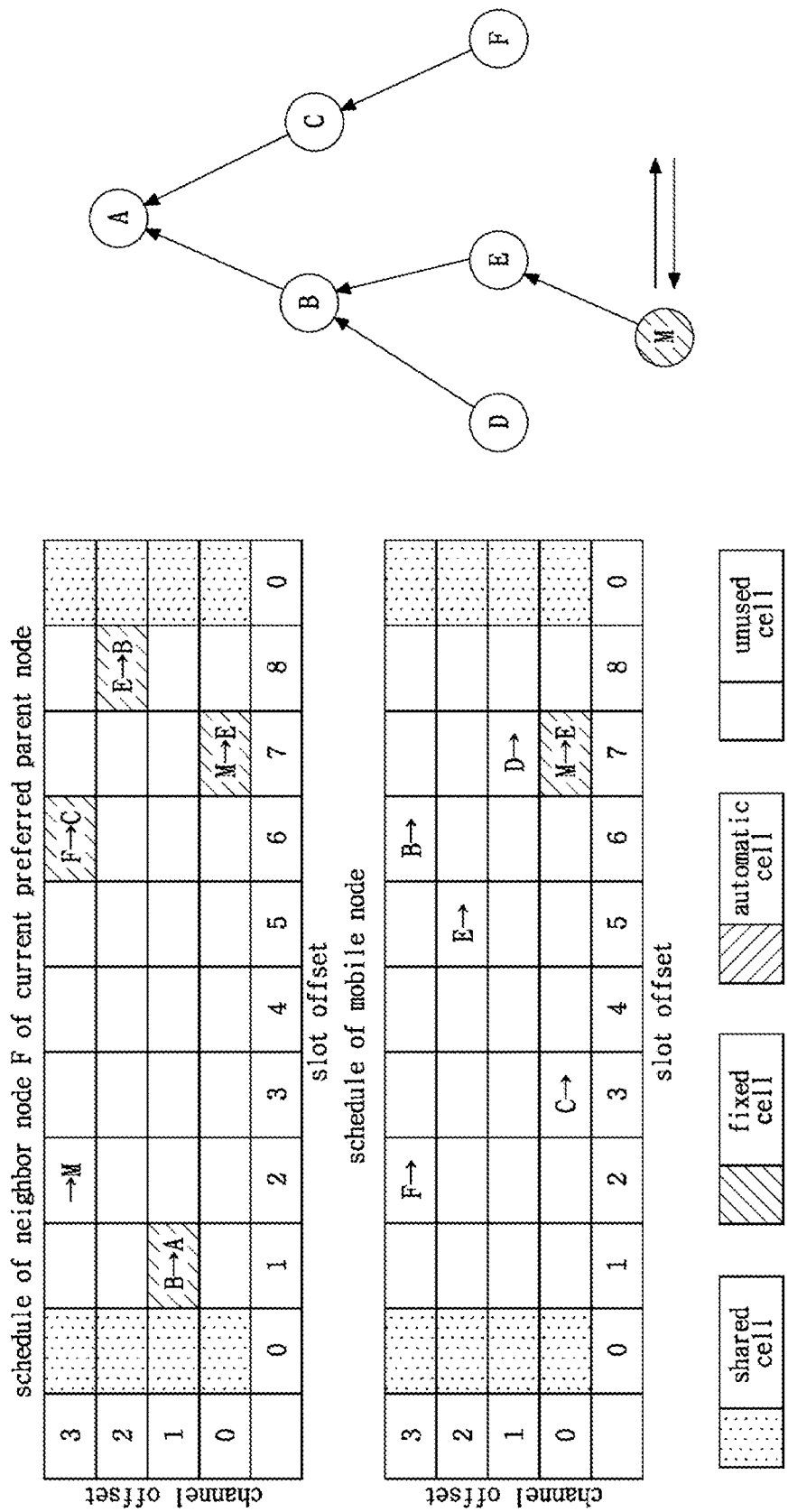
FIG. 10 is a configuration diagram illustrating schedule information possessed by one of neighbors of a current preferred node of a mobile node and the mobile node.

FIG. 10 is a configuration diagram illustrating schedule information possessed by one of neighbors of a current preferred node of a mobile node and the mobile node.

It is an algorithm performed after a movement-route node fixed path construction algorithm.

While the movement-route node fixed path propagates to neighbor nodes, a MAC address of the mobile node is also delivered.

At this time, a unicast control-only Tx cell is allocated by determining a slot offset and a channel offset using a hash value of the sum of the MAC address of the neighbor node which has received the movement-route node fixed path and the MAC address of the mobile node.

The assigned cell is normally maintained in a sleep state, and when the mobile node broadcasts a flag to the shared cell with a DIS message indicating that it has been released from its preferred parent and needs to configure a new topology, a unicast DIO message destined for the mobile node is sent from the cell.

A mobile node also receives a DIO message containing its MAC address propagated by its neighbor node while maintaining the topology. When the mobile node receives the DIO message, it determines a slot offset and a channel offset using the MAC address of the neighbor node and itself and allocates a unicast control-only Rx cell.

Because the neighbor node and the mobile node know each other's MAC addresses and a unicast control-only cell is allocated based on the MAC address hash value, a collision between neighbor nodes does not occur.

FIG. 10 shows schedule information possessed by one of the neighbors of the current preferred node of the mobile node and the mobile node.

In a cell where (slot offset, channel offset)=(2, 3), a neighbor node F of the preferred parent node of the current mobile node allocates a control-only Tx cell directed to the mobile node based on the MAC address. The mobile node also allocates a control-only Rx cell from a neighbor node in a cell where (slot offset, channel offset)=(2, 3). Since communication with the preferred node is still continuing, although the control-only cell is allocated, the radio is turned off and packet exchange is not performed in the cell.

Figures 11, 12:
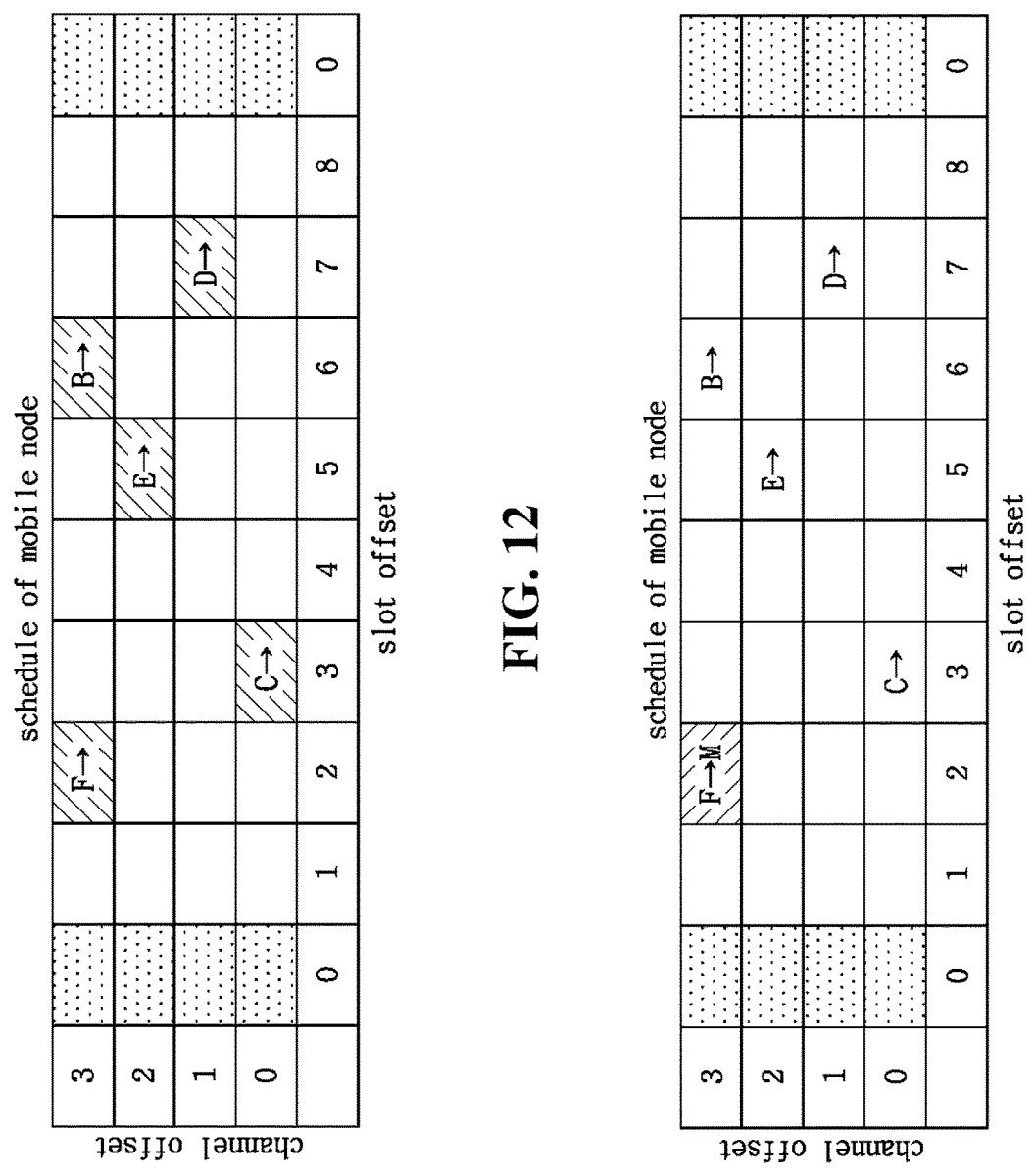

FIG. 11 is a block diagram illustrating a process of turning on a radio in a control-only Rx cell of a neighbor node and receiving a unicast control message, and FIG. 12 is a block diagram illustrating a process of turning off the radio of a control-only Rx cell of a slot offset so that unicast control messages from other neighbor nodes are not received any longer.

When the mobile node detects release of the link with the preferred parent node due to movement of the mobile node, the mobile node broadcasts a DIS message in the shared cell and turns on the control-only cell Rx radio of the mobile node.

From a next slot frame, a neighbor node may receive a unicast control message in the corresponding cell. The neighbor node turns on the Rx radio in the shared cell and receives the DIS message of the mobile node.

When a shared cell of a neighbor node detects a DIS message from the mobile node, the unicast-only Tx cell immediately sends a unicast control message to the mobile node.

As shown in FIG. 11, the mobile node turns on the radio in the control-only Rx cell of the neighbor node and receives a unicast control message. Since the purpose of the algorithm is to quickly recover a link by receiving the DIO message without a collision, if even one of the control-only Rx cells is received, the radio of the control-only Rx cell of the slot offset is turned off as shown in FIG. 12 so that unicast control messages of other neighbor nodes may not be received any longer.

The neighbor node that receives an ACK for the DIO message in the unicast-only Tx cell sends a DIO message in a next slot frame sharing cell, and the neighbor node that does not receive the ACK does not send the DIO message. The mobile node minimizes DIO message collisions in the shared cell, configures routing paths with the preferred parent node, and initiates data transmission.

As described above, in the fast cell allocation scheduling device and method for a mobile node in a 6TiSCH network according to the present disclosure, a communication node satisfies stability of an industrial application and real-time requirements through high reliability and low power operation by combining a time slot access, multiple channels, and a channel hopping technology of time slotted channel hopping (TSCH), and in response to a change in link quality of a mobile node immediately, a packet thereof is delivered to a neighbor node to reset a path and drop of a transmitted packet is minimized.

As described above, it will be understood that the present disclosure is implemented in a modified form without departing from the essential characteristics of the present disclosure.

Therefore, the specified embodiments are to be considered in an illustrative rather than a restrictive view, the scope of the present disclosure is indicated in the claims rather than the foregoing description, and all differences within the equivalent scope should have to be interpreted to be included in the present disclosure.

DETAILED DESCRIPTION OF MAIN ELEMENTS 10. link release detection unit
20. DIS message transmission unit
30. unicast control message reception unit
40. DIO message reception unit
50. Preferred parent node setting unit
60. packet transceiver unit

What is claimed is:

1. A fast cell allocation scheduling device for a mobile node in a 6TiSCH network, the fast cell allocation scheduling device comprising:
a link release detection unit configured to allow a mobile node to detect release of a link to a preferred parent node due to movement of the mobile node;
a DIS message transmission unit configured to allow the mobile node to broadcast a DIS message from a shared cell;
a unicast control message reception unit configured to receive a unicast control message when a shared cell of a neighbor node detects a DIS message transmitted from the mobile node and transmits the unicast control message to the mobile node from a unicast-only Tx cell;
a DIO message reception unit configured to receive a DIO message including a MAC address of neighbor node propagated from the neighbor node when a unicast DIO message to be directed toward the mobile node is sent from the shared cell;
a preferred parent node setting unit configured to allow the mobile node to minimize a collision of the DIO message in the shared cell and to configure a routing path; and
a packet transceiver unit configured to start data transmission when a routing path is configured with the preferred parent node,
wherein, when link quality of the mobile node is changed, a fixed path directed to a route node is allocated to establish a movement-route node fixed path minimizing a delay time between the mobile node and the route node.

2. The fast cell allocation scheduling device of claim 1, wherein,
to establish the movement-route node fixed path, a new node participates in a network, and when a DAO message is transmitted to the route node, the route node collects a MAC address of the node participating in the network and adds a movement flag in the DAO message to distinguish between a stop node and a mobile node.

3. The fast cell allocation scheduling device of claim 2, wherein
the DAO message is received from the route node, and when the DAO message is not a mobile node, a slot offset and a channel offset are stored in an automatic cell using a hash value of a MAC address of a node transmitting DAO so as to become a basis for allocating a Tx cell of the mobile node when the movement-route node fixed path is formed.

4. The fast cell allocation scheduling device of claim 3, wherein
the route node allocates a movement-route node fixed path starting cell in a position in which an influence on a schedule is minimized based on cell information of the route node.

5. The fast cell allocation scheduling device of claim 4, wherein
a shared cell and an automatic cell are stored in the route node, the shared cell is a dedicated cell for exchanging an EB, DAO, or DIO control message and the automatic cell is a value stored to allocate a Tx cell of the mobile node in the movement-route node fixed path in the route node, and communication is not performed in a corresponding cell.

6. The fast cell allocation scheduling device of claim 2, wherein,
when a cell negotiation process has undergone to the route node, the route node puts a negotiation completion message and movement-route fixed path routing table in a DIO frame and propagates the message and the table so that DIO is shared in every node participating in a network, and all the nodes of the network store a MAC address of the mobile node and the movement-route fixed path.

7. A fast cell allocation scheduling method for a mobile node in a 6TiSCH network, the fast cell allocation scheduling method comprising:
detecting release of a link to a preferred parent node by a mobile node;
broadcasting, by the mobile node, a DIS message in a shared cell;
when a DIS message transmitted from the mobile node is detected in a shared cell of a neighbor node, immediately transmitting a unicast control message from a unicast-only Tx cell to the mobile node, turning on a radio in a control-only Rx cell of the neighbor node and receiving a unicast control message by the mobile node;

when a unicast DIO message directed toward the mobile node is transmitted in the shared cell, receiving, by the mobile node, a DIO message including a MAC address of itself propagating by the neighbor node while the mobile node maintains a topology;

configuring, by the mobile node, a routing path with the preferred parent node, while minimizing a collision of the DIO message in the shared cell; and starting data transmission when the routing path to the preferred parent node is configured.

8. The fast cell allocation scheduling method of claim 7, wherein, to establish the movement-route node fixed path, a new node participates in a network, and when a DAO message is transmitted to the route node, the route node collects a MAC address of the node participating in the network and adds a movement flag in the DAO message to distinguish between a stop node and a mobile node.

9. The fast cell allocation scheduling method of claim 8, wherein the DAO message is received from the route node, and when the DAO message is not a mobile node, a slot offset and a channel offset are stored in an automatic cell using a hash value of a MAC address of a node transmitting DAO so as to become a basis for allocating a Tx cell of the mobile node when the movement-route node fixed path is formed.

10. The fast cell allocation scheduling method of claim 8, wherein, after the movement-route node fixed path is established, a MAC address of the mobile node is delivered together, while propagating to neighbor nodes in the movement-route node fixed path, and a slot offset and a channel offset are determined using a hash value of the sum of a MAC address of a neighbor node which has received the movement-route node fixed path and a MAC address of the mobile node to allocate a unicast control-only Tx cell.

11. The fast cell allocation scheduling method of claim 10, wherein the allocated cell is maintained usually in a sleep state, and when connection of the mobile node to its preferred parent node is established and the mobile node broadcasts a flag indicating the necessity of configuring a new topology included in a DIS message, a corresponding cell transmits a unicast DIO message directed toward the mobile node.

12. The fast cell allocation scheduling method of claim 11, wherein, while the mobile node maintains the topology, a DIO message including its MAC address propagated by the neighbor node is received, and when the mobile node receives the DIO message, the mobile node determines a slot offset and a channel offset using the MAC addresses of the neighbor node and the mobile node and allocates a unicast control-only Rx cell, so that since the MAC addresses of the neighbor node and the mobile node are known and the unicast control-only cell is allocated based on the MAC address hash value, a collision with the neighbor node does not occur.

\* \* \* \* \*